US006442726B1

(12) United States Patent
Knefel (10) Patent No.: US 6,442,726 B1
(45) Date of Patent: Aug. 27, 2002

(54) ERROR RECOGNITION IN A STORAGE SYSTEM

(75) Inventor: Hans-Werner Knefel, Martinsried (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/254,085

(22) Filed: Mar. 1, 1999

(30) Foreign Application Priority Data

Aug. 30, 1996 (DE) .......................................... 196 35 239

(51) Int. Cl.[7] ........................ H03M 13/11; G06F 11/10; G11C 29/00
(52) U.S. Cl. ........................ 714/763; 714/773; 714/805
(58) Field of Search ................................ 714/805, 768, 714/773, 763

(56) References Cited

U.S. PATENT DOCUMENTS

| 5,164,944 A | | 11/1992 | Benton et al. ............. 371/40.1 |
| 5,537,425 A | * | 7/1996 | Tsou ........................... 371/51.1 |
| 5,663,969 A | * | 9/1997 | Tsou ........................... 371/51.1 |
| 5,751,745 A | * | 5/1998 | Chen et al. ................. 371/51.1 |
| 5,841,795 A | * | 11/1998 | Olarig et al. ............... 371/40.3 |

FOREIGN PATENT DOCUMENTS

| DE | 26 55 653 | 6/1978 |
| DE | 33 19 710 A1 | 12/1984 |
| DE | 35 28 902 C3 | 6/1986 |

\* cited by examiner

Primary Examiner—Stephen M. Baker
(74) Attorney, Agent, or Firm—Bell, Boyd & Lloyd LLC (57) ABSTRACT

A memory system is disclosed wherein data contents of the memory system are protected via an EDC coding method and wherein, in order to be able to recognize addressing errors, addresses are also involved in such EDC coding.

1 Claim, 5 Drawing Sheets

DTW1

| | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| O | | | X | X | | X | X | X | X | X | | | | | X | |
| O | | X | X | X | X | X | X | | | X | X | X | X | X | X | |
| E | X | | X | X | | X | | X | X | | X | | X | X | | X |
| E | X | X | X | X | X | X | | | | | X | | | | | X |
| O | | X | X | | X | | | | | X | | | X | | | |
| O | X | X | | | X | X | | X | | | X | | | | X | |
| O | | X | | X | | | X | | X | | | X | X | | | X |
| O | | | | | X | | | | | | | | | | | |

DTW2

| | 16 | 17 | 18 | 19 | 20 | 21 | 22 | 23 | 24 | 25 | 26 | 27 | 28 | 29 | 30 | 31 | |
|---|---|---|---|---|---|---|---|---|---|---|---|---|---|---|---|---|---|
| | | X | X | | X | | | | X | | | | | X | | | C0 |
| | X | X | | | X | X | | X | | | X | | | | X | | C1 |
| | | X | | X | | | X | | X | | | X | X | | | X | C2 |
| | | | | | X | | | | | | | | | | | | C3 |
| | | X | X | | X | X | X | X | X | | | | | | X | | C4 |
| | | X | X | X | X | X | X | | | X | X | X | X | X | X | | C5 |
| | X | | X | X | | X | | X | X | | X | | X | X | | X | C6 |
| | X | X | X | X | X | X | | | | | | X | | | | X | C7 |

KWT1: C0–C3; KWT2: C4–C7

Respectively accommodated in a x4-organized DRAM module

FIG. 2

Monitoring of the CMY-intern address paths
(Address halves) Word halves 0

|   | 00 | 01 | 02 | 03 | 04 | 05 | 06 | 07 | 08 | 09 | 10 | 11 | 12 | 13 | 14 | 15 |    |
|---|----|----|----|----|----|----|----|----|----|----|----|----|----|----|----|----|----|
| 0 |    |    |    |    | X  | X  | X  | X  | X  |    |    |    |    |    | X  |    | C0 |
| 0 |    |    |    |    |    | X  | X  | X  |    | X  | X  | X  | X  | X  | X  |    | C1 |
| E |    |    |    |    |    | X  |    | X  | X  |    | X  |    | X  | X  |    | X  | C2 |
| E |    |    |    |    |    | X  | X  |    |    |    |    | X  |    |    |    | X  | C3 |
|   |    |    |    |    |    |    |    |    |    |    |    |    |    |    |    |    | C4 |
|   |    |    |    |    |    |    |    |    |    |    |    |    |    |    |    |    | C5 |
|   |    |    |    |    |    |    |    |    |    |    |    |    |    |    |    |    | C6 |
|   |    |    |    |    |    |    |    |    |    |    |    |    |    |    |    |    | C7 |

(Address half) Word half 1

| 16 | 17 | 18 | 19 | 20 | 21 | 22 | 23 | 24 | 25 | 26 | 27 | 28 | 29 | 30 | 31 |    |
|----|----|----|----|----|----|----|----|----|----|----|----|----|----|----|----|----|
|    |    |    |    |    |    |    |    |    |    |    |    |    |    |    |    | C0 |
|    |    |    |    |    |    |    |    |    |    |    |    |    |    |    |    | C1 |
|    |    |    |    |    |    |    |    |    |    |    |    |    |    |    |    | C2 |
|    |    |    |    |    |    |    |    |    |    |    |    |    |    |    |    | C3 |
|    |    | X  | X  |    | X  | X  | X  | X  | X  |    |    |    |    | X  |    | C4 |
|    | X  | X  | X  | X  | X  | X  |    |    |    | X  | X  | X  | X  | X  | X  | C5 |
| X  |    | X  | X  |    | X  |    | X  | X  |    | X  |    | X  | X  |    | X  | C6 |
| X  | X  | X  | X  | X  | X  |    |    |    |    |    |    | X  |    |    | X  | C7 |

"O" next to the rows means the following:
    If the number of "ones" included in the appertaining
    address part is odd, then the allocated parity bit = 1 !

"E" next to the rows means the following:
    If the number of "ones" included in the appertaining
    address part is odd, then the allocated parity bit = 0 !

Data errors arising in Section X
are detected at Checkpoint Y.

| Checkpoint: Y \ Section X | 1 | 2 | 3 | 4 | 5 | 6 | 7 | 8 | 9 |
|---|---|---|---|---|---|---|---|---|---|
| A1 | X | | | | | | | | |
| B | X | X | | | | | | | |
| C | X | X | X | X | X | X | | | |
| A2 | X | X | X | X | X | X | X | X | X |

ERROR RECOGNITION IN A STORAGE SYSTEM

BACKGROUND OF THE INVENTION

1. Field of the Invention

The present invention relates, generally, to a memory system having data contents which are protected via an EDC method and, more particularly, to such a memory system wherein, in order to also recognize addressing errors, addresses are involved in the EDC coding.

2. Description of the Prior Art

The data contents of memory systems are often protected in such a way that a plurality of redundant bits are additionally co-stored under the address of a data word. These bits are called check bits, K-bits or ECC-bits and then arise by forming the parity sum over specific parts of the data word, which is usually referred to as EDC coding ("EDC" abbreviated for Error Detection Code). Upon readout of the memory word, the sub-parities are formed anew and compared to the allocated K-bits that are likewise readout. When there is equality for all K-bits, then it is concluded that the readout data word is error free. Given inequality, conclusions about the kind of error are drawn from the pattern of the non-coincidence, what is referred to as the syndrome pattern.

Those K-bit positions that do not agree in the above-described comparison are called syndromes. Specific syndrome patterns are decoded and the falsified bit position in the data word is thus potentially determined and corrected by inverting.

The formation of the K-bits (EDC encoding), the comparison of the K-bits, the decoding of the syndromes as well as the correction and potential alarm to a higher-ranking controller typically occurs with the assistance of specific controller modules, which are also referred to as EDC controllers below.

The document U.S. Pat. No. 5,164,944 discloses a memory system of this species.

When an addressing error is present, such error cannot be recognized by the previously described error monitoring system upon readout since the addressing error does not negatively affect the consistency of the data word. In order to also recognize addressing errors, it is not only the data word but also the memory address of the data word that is involved in the EDC encoding (i.e., in the parity formation) in a development of the error monitoring system.

As a result of involving the address in the EDC encoding, however, the outlay for the error monitoring system is considerably increased since, for example, twice the number of EDC controllers is required. Further, the EDC coding for data and address must be different.

SUMMARY OF THE INVENTION

Accordingly, in an embodiment of the present invention, a memory system is described wherein a check word is co-stored together with a respective data word, and wherein the memory system further includes: an error monitoring system, wherein the error monitoring system generates the check word, before the check word is co-stored, based on a data word to be written in and from a write address according to an EDC code formation rule, and wherein the error monitoring system generates the check word anew based on a data word to be read out from the memory system, and compares bits of the check word to bits stored for the data word and, given inequality, draws conclusions about a type of error from a syndrome pattern; and a time division multiplex means that enables generation, according to the same coding means, of the check word from the write address, and of the data word to be written in.

Additional features and advantages of the present invention are described in, and will be apparent from, the Detailed Description of the Preferred Embodiments and the Description of the Drawings.

DETAILED DESCRIPTION OF THE PREFERRED EMBODIMENTS

Figure 1:
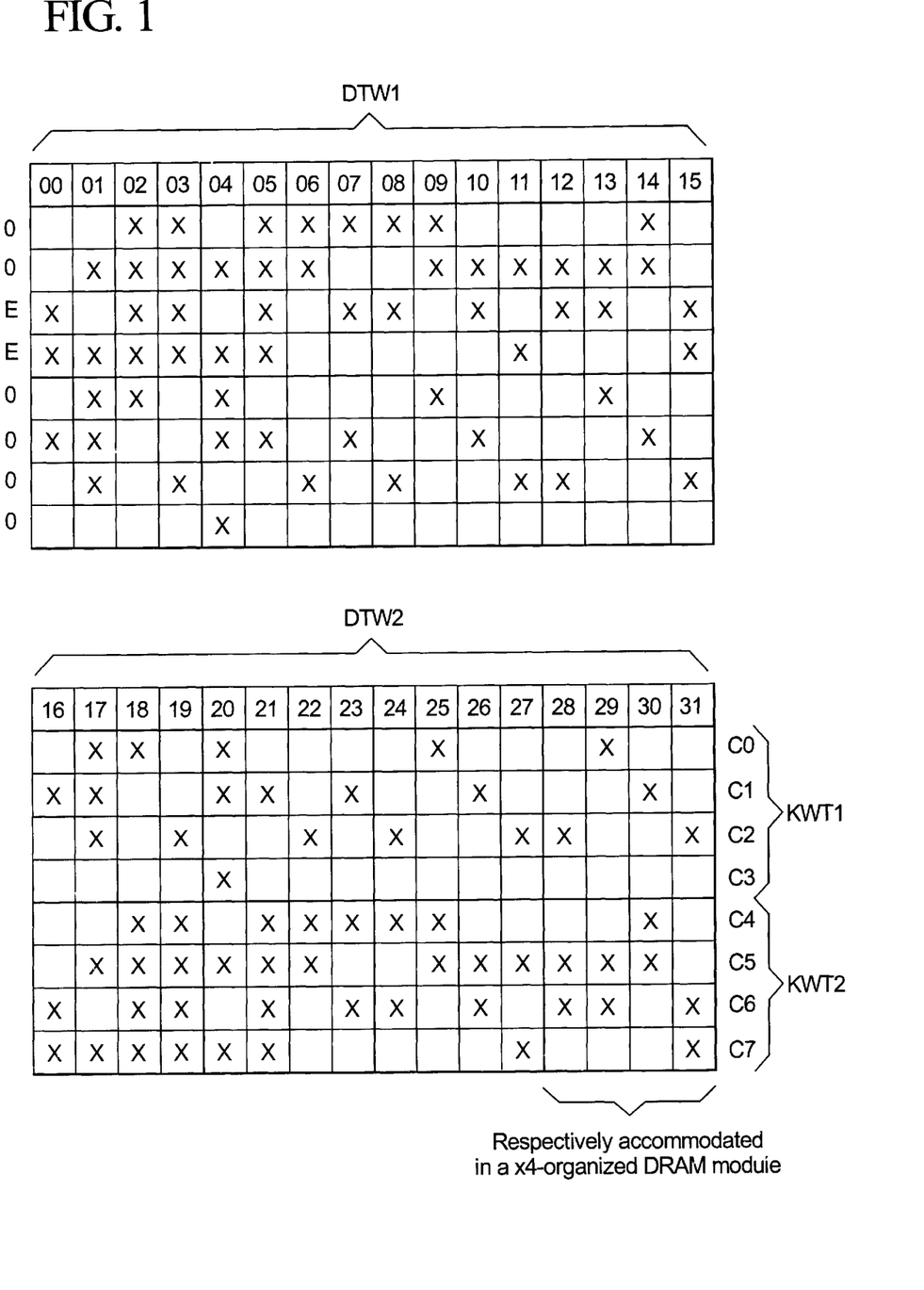
FIG. 1 is an EDC-code table which shows bit positions over which K-bits are formed in an EDC controller.

In FIG. 1, the character "X" denotes that the allocated data bit N ($00=<N=<31$) is involved in the parity formation for the checkbit C ($C0=<C<C7$). The character "0" next to the lines of the bottom memory word half means that the appertaining C-bit is equal to 1 when the number of "1's" involved in the parity bit formation is uneven in the entire useful bit part. The character "E" next to the lines of the bottom memory word half means that the appertaining C-bit is equal to 0 when the number of "1's" involved in the parity bit formation is uneven in the entire useful bit part. These two latter statements thus relate to both halves of the memory word together.

Data words that include 32 data bits are assumed in FIG. 1. Eight check bits C0, C1, C2 . . . C7 that are respectively formed by parity formation over specific bit positions of a data word are allocated to these data bits. The entire memory word, i.e. the useful word (address or data) plus check word, thus covers 40 bits. These are organized in DRAM memory modules with a cell width of four bits.

Due to the check bits formed according to the EDC code tables, a one-bit error and can be reliably recognized and can lead to odd-numbered syndrome patterns. Further, a correction of one-bit errors can be implemented since every error bit position within a useful word has an unambiguous syndrome pattern permanently allocated to it. This syndrome pattern can be decoded and, thus, utilized for the correction of the faulty bit.

Finally, multi-bit errors can be recognized. For example, double-bit errors always lead to even-numbered syndrome pattern unequal to 0 and are therefore reliably recognized as multi-bit errors. The other even-numbered multi-bit errors likewise always lead to even-numbered syndrome patterns whereby the zero syndrome arises with a probability of $1/128$ since there are a total of 128 even-numbered syndrome patterns given this ECC width (number of K-bits). These errors therefore immediately lead to a multi-bit error alarm with a probability of 99.2%.

Odd-numbered multi-bit errors lead to odd-numbered syndrome patterns whereby the syndrome patterns of 1-bit errors can also arise. These errors are therefore immediately recognized as multi-bit errors with 68.75% probability. This number arose as follows: Given an 8-bit ECC width, there are a total of 128 odd-numbered syndrome patterns. Of these 128 patterns, 40 are reserved for 1-bit errors. 128−40=88 patterns which remain for odd-numbered multi-bit errors. The probability that one of these patterns is encountered given an arbitrary, odd-numbered multi-bit error is thus 88/128=68.75%.

It can therefore be derived that arbitrary multi-bit errors trigger an immediate alarm as multi-bit errors with a probability of 215/256=84%. The even-numbered multi-bit errors have also been taken into consideration; these, of course, causing the zero syndrome in 1 of 128 instances. This number in turn derives as follows: Given an 8-bit ECC width, there are a total of 256 syndrome patterns. Of these 256 patterns, 40 are reserved for 1-bit errors and one pattern is the zero syndrome pattern. 256−40=215 patterns thus remain for multi-bit errors. The probability that one of these patterns is encountered given an arbitrary multi-bit error is thus 215/256=84%.

When an error is then present in the drive of the memory units (for example, memory modules) of the memory system that are driven in common, i.e. parallel, in the context of a memory access, syndrome patterns can thus arise that simulate a correctable one-bit error and thus are not recognized as errors of the drive. Other errors are also conceivable (for example, outage of the write pulse) that would not be recognizable at all via the EDC controller.

This problem can be substantially alleviated when the memory modules that are activated in common when reading are supplied by a plurality of drive signals of the same type that derive from independent drive units. In this case, one counts only on an outage of one of these signals (i.e., failure of one 5control unit). As a result, for example, data and check bits of different memory words can be mixed with one another upon readout. Despite this measure, which is referred to in short below as measure A, one-bit errors or even freedom from error can still be simulated, although with lower probability.

This latter problem, however, can be prevented by skilled division of the data and the check bits onto the memory units in combination with the appertaining selection of the EDC code. One can see from FIG. 1 that a segment of the check word that is not stored together with that segment of the data word in which a one-bit falsification is present (for example, the data word segment DWT1 with the check word segment KWT1) can only respectively contribute an even number to the SynMu. On the other hand, a segment of the data word that is stored together with the segment of the check word (for example, the segment DWT1 with KWT2) can only contribute an odd number to the SynMu. The latter case, however, cannot occur given errors that arise due to the incorrect drive (addressing) of a memory unit. Only even-numbered syndrome patterns can thus arise given an incorrect drive.

The skilled division of the data and the check bits onto the memory units in combination with the appertaining selection of the EDC code is referred in brief below as measure B. The general formation rule for this division given more than two storage medium units is disclosed in greater detail in German Patent Application P 35 28 902.3-31 (GR 84 P 1995 internal at Siemens AG).

Due to such division of the memory word onto the storage medium units and the selection of the EDC code corresponding thereto, only even-numbered syndrome patterns can arise in instances wherein the data and the check bits of a drive unit are incorrectly selected. Since correctable one-bit errors only generate odd-numbered syndrome patterns, the risk of confusing the one-bit errors with the drive errors is eliminated in this way.

Unfortunately, the errors "all 0" or "all 1" in a memory word half (=half the data plus appertaining half of the C-bits) can still lead to odd-numbered syndrome patterns despite measure B and, thus, can simulate correctable one-bit errors.

In order to prevent this, the EDC code is additionally selected such that a data word segment, i.e. a segment of the data word that is not stored together with another segment of the data word (for example, the segments DWT1 or, respectively, DWT2 in FIG. 1), participates in the formation of a K-bit with a respectively even plurality of bit places insofar as it is a matter of a data word segment that is not stored together with this K-bit, and participates with an odd plurality of bit places insofar as it is a matter of a data word segment that is stored together with this K-bit.

Due to the selection of the EDC code, which is referred to in brief below as measure C, the errors "all 0" or "all 1" in a memory word half (half of the data+appertaining half of ECC bits) will always lead to odd-numbered syndrome patterns. As a result, these errors are reported as multiple errors. Since the two word halves are driven by separate controllers and many control errors have the above-described effect (all 0 or all 1), distinguishing these errors from 1-bit errors is considerably improved.

Figure 3:
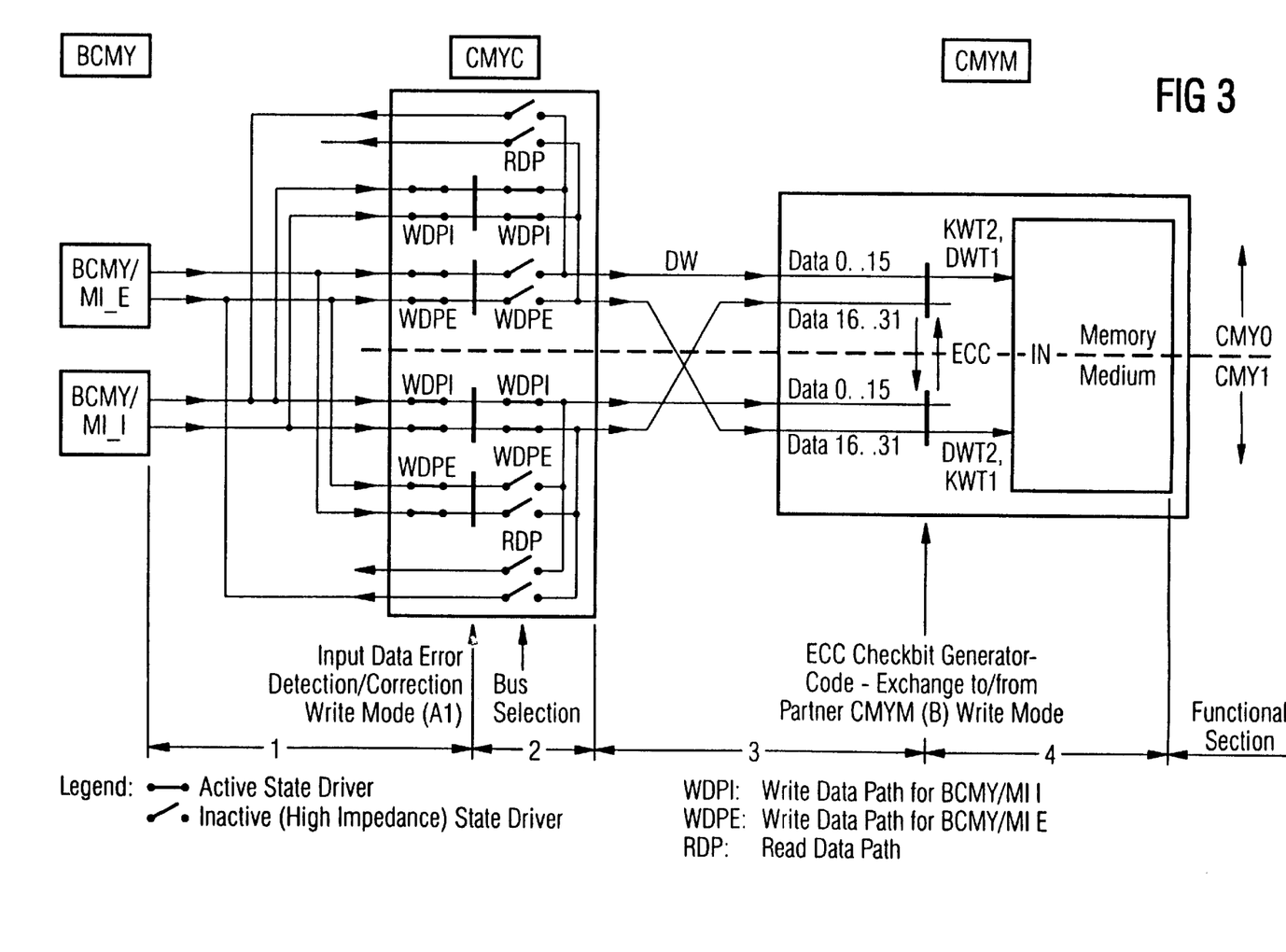
FIG. 3 shows an embodiment of the system of the present invention.

FIG. 3 shows an inventive memory system CMY that include a redundant (memory) control system CMYC, a (memory) medium system CMYM ("memory" in short) with two memory units, i.e. two (memory) medium halves, as well as a redundant bus interface BCMY via which the connection to the bus system of a computer system is produced. The memory system includes error monitoring that, with the assistance of EDC controllers, offers different check points dependent on the machine cycle (read or write cycle).

All data paths in the CMY, i.e. between MBCY and CMYM, are redundantly present. The full width of the data words (32 bits) is utilized in each data path at the check points by corresponding EDC controllers for error monitoring independently of one another. In particular, the configuration of the data paths and the check points of the memory system for a write cycle is shown in FIG. 3.

In the write cycle, the write data and appertaining K-bits coming from BCMY first proceed via write paths WDPI to a check point Al. The aforementioned error monitoring, wherein bit errors (one-bit or multi-bit errors) are recognized and one-bit errors are even corrected, is implemented at this check point. Subsequently, the write data are redundantly forwarded (but without check bits) to the memory CMYM.

At check point B, i.e. immediately before the write data are written into the memory, a check word is again generated from the write data in each of the two transmission halves and a comparison ECC of the two check words is implemented. The two check words are identical only when the data in both halves were processed error-free up to that point; otherwise, a multiple or uncorrectable error alarm is triggered. Errors that, among other things, are based on an error-affected transmission between A1 and B, or are caused by fault-affected EDC networks at the check points Al or B, are found by the comparison ECC.

The check bits of control point Al are not needed for the check point B since they are generated again from the write data at the check point B, i.e. immediately before the write data are written into the medium system, and since they are not required for the error monitoring between A1 and B. The error monitoring between A1 and B, of course, is already assured by the comparison of the two check words formed at the check point B.

The transmission path of the data between A1 and B is partially crossed out. When a selection error (drive error) is present in one transmission half, then inconsistencies arise at the check point B. This leads to the reporting of a multiple error.

When the comparison at check point B yields no inconsistencies, then the data together with check word are written into the medium system. In particular, the data bits 0 . . . 15 (DWT1) together with the K-bits 4 . . . 7 (KWT2) are written into the one medium half and the data bits 16 . . . 32 (DWT2) together with the K-bits 0 3 (KWT1) are written into the other medium half.

Due to the explained section-by-section monitoring of the data paths for control errors iVm, with the exchange of the memory word halves between both controllers, the location at which the error has arisen can be derived from the combined consideration of the alarms of different EDC modules.

In order to prevent a potentially faulty write event that occurs in section 4, i.e. directly at write-in, a read/write cycle is implemented instead of a pure write cycle, wherein an EDC check of the read data and, thus, a check of the drive of a memory cell occurs before a correctly driven memory cell is overwritten by the misdrive of a faulty write event. The read event thereby remains internal, such that the BCMY does not accept the read data in order to output them onto the bus. The write data are intermediately stored in the CMYM until the end of the read check. As a result of this measure, the system effects of control errors are kept slight and the (control) errors are distinguished better and recognized faster.

What this measure affects, combined with measures A and B, is that errors in the selection of a memory word half (caused, for example, by addressing errors) are already recognized before the readout of the falsified memory word. Combined with measure C, this likewise applies to the addressing errors of entire memory words. The same advantage applies given multi-bit falsifications that are caused by errors within a memory module.

For reasons of clarity, the application of the EDC coding was explained only with respect to the data word up until now. In fact, however, it is not only the data word but also the memory address of the data word that is co-involved in the EDC coding; i.e., in the parity formation (see FIG. 2). The EDC code is thereby selected such with respect to the address word that only an even-numbered syndrome pattern can arise given a one-bit error in the address word.

This, however, means that only an even-numbered syndrome pattern can arise given a multiple bit error. The reporting of a multiple error, i.e. of an uncorrectable error, thus always arises given an addressing error. The involvement of the address into the EDC coding is disclosed in greater detail in Published Application DE 3319710 A1 (83 P 1382 DE, internal Siemens AG) and is referred to in brief below as measure C.

In order to minimize the outlay of the generation of the address parity bits required for measure C, an additional utilization of the data EDC modules occurs for generating the address parity bits. This becomes possible by time-division multiplex of address and data as well as formation of the address parity bits according to FIG. 2; i.e., from a subset of the EDC coding of FIG. 1. As a result thereof, the condition of even-numbered per address bit required for measure C is adhered to. The condition of even-numbered nature of specific code segments needed for measure B is utilized therefor.

Figure 4:
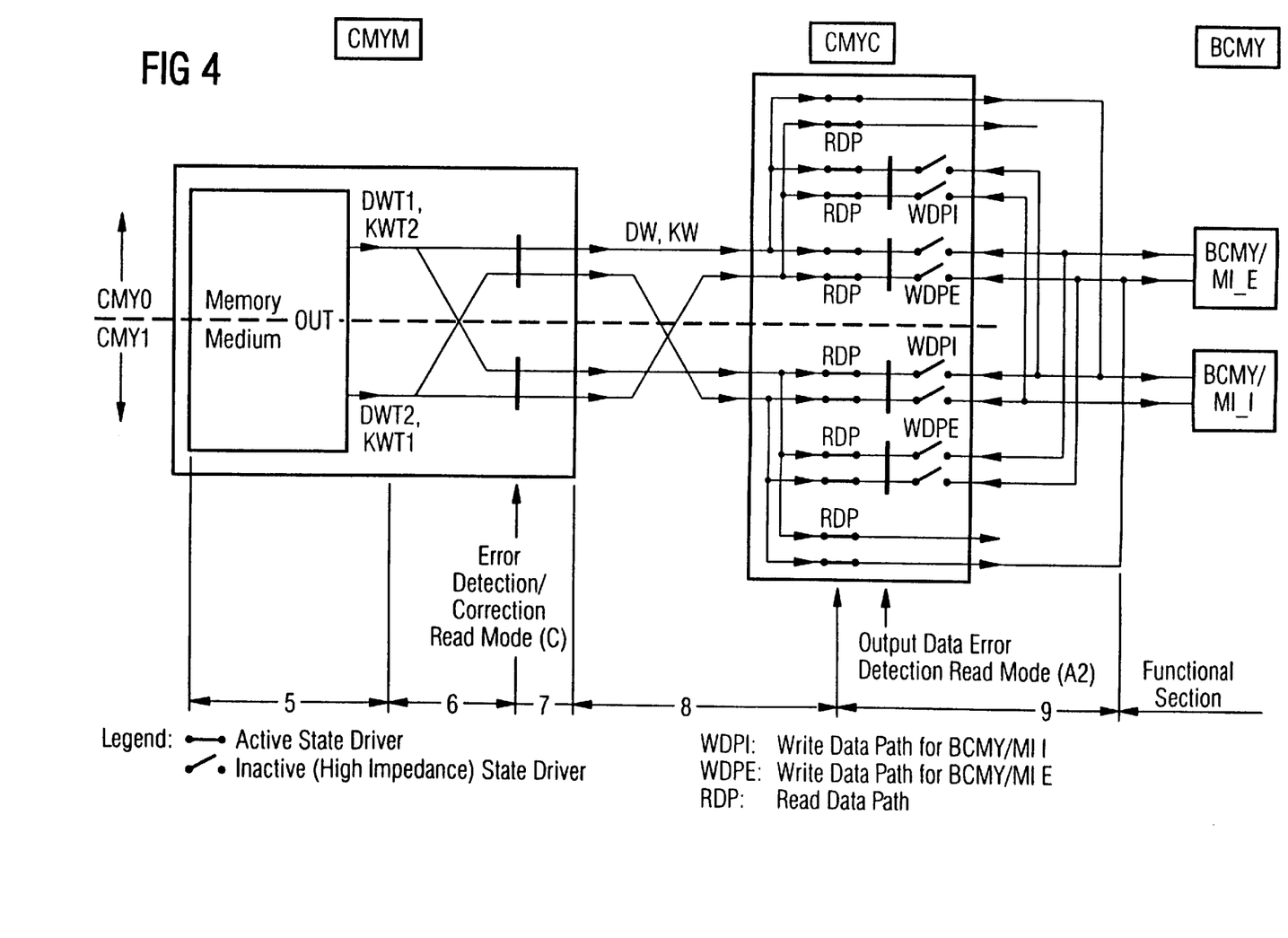
FIG. 4 shows the configuration of the data paths and check points of the memory system of the present invention for a read cycle.

FIG. 4 shows the configuration of the data paths and check points of the memory system for a read cycle. During the read cycle, the data word and the appertaining check word are first read out and proceed to the check point C at which an error recognition and, as warranted, error correction are implemented. Subsequently, the data word and the check word is forwarded to the bus interface BCMY, whereby an error recognition is implemented again at the check point A2. In case of, such error, the bus interface BCMY blocks the forwarding of the data word and of the check word onto the bus. In this case, moreover, the faulty memory system half (CMYO or CMY1) is disconnected from the bus interface BCMY.

Figure 5:
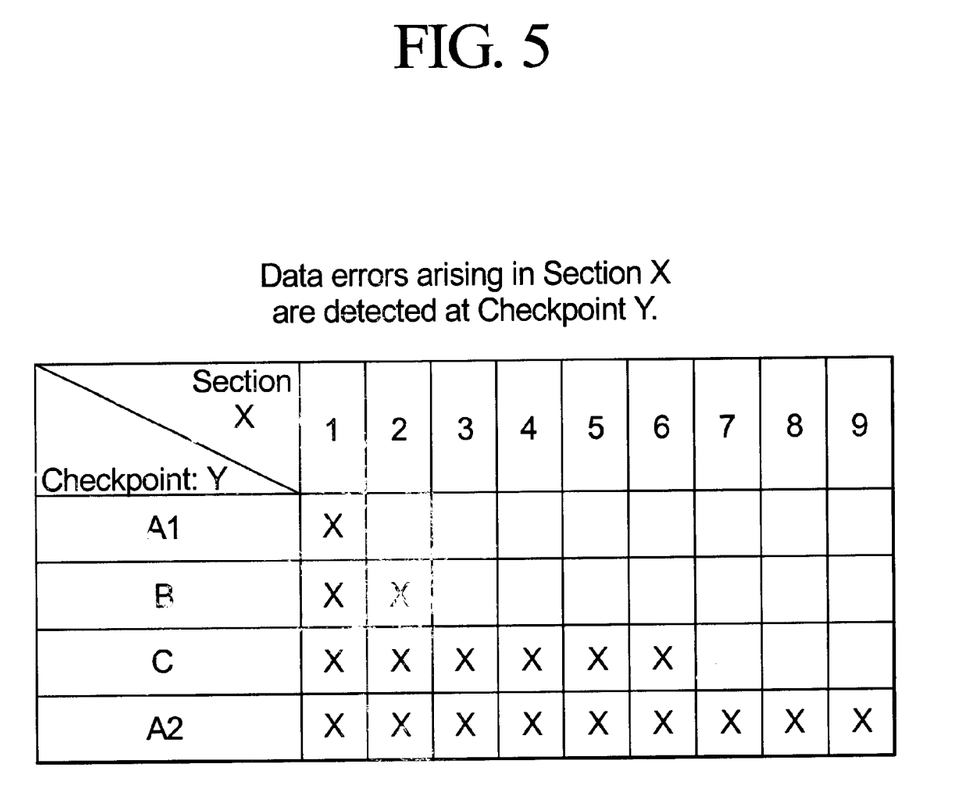
FIG. 5 shows the check point at which certain data errors are recognized in the present invention.

Compared to FIGS. 3 and 4, FIG. 5 shows the check point (check point Y) at which data errors that occur in a specific section (section X) of the memory system are recognized. Examples of specific errors and their handling by the error monitoring system now follow.

Example 1: Recognition of control errors with the EDC protection Error case: incorrect selection of a memory word half Means for recognition: measure A and B Allocation of the bit positions:

X = selected by control 0, Y = selected by control 1
bold = faulty information part

```
31                              16 15                          00
Y Y Y Y Y Y Y Y Y Y Y Y Y Y Y Y X X X X X X X X X X X X X X X X
                      C7   C4   C3   C0
                      X X X X Y Y Y Y
``` consistent memory word under address 1:

```
31                              16 15                          00
0 0 0 0 0 0 0 0 0 0 0 0 0 0 0 0 0 0 0 0 0 0 0 0 0 0 0 0 0 0 0 0
                      C7   C4   C3   C0
                      0 0 0 0 1 1 0 0
``` consistent memory word under address 2:

```
31                              16 15                          00
1 1 1 1 1 1 1 1 1 1 1 1 1 1 1 1 1 1 1 1 1 1 1 1 1 1 1 1 1 1 1 0
                      C7   C4   C3   C0
                      1 1 0 1 1 1 1 1
```

When reading under address 2, control 0 incorrectly read out under address 1. This leads to the following read information:

```
31                              16 15                          00
1 1 1 1 1 1 1 1 1 1 1 1 1 1 1 1 0 0 0 0 0 0 0 0 0 0 0 0 0 0 0 0
                      C7   C4   C3   C0
                      0 0 0 0 1 1 1 1
```

The ECC bits that were formed over readout data:

$$\underset{C7}{0\ 0\ 0\ 0}\ \underset{C4}{0\ 0}\ \underset{C3}{0\ 1}\ \underset{C0}{1}$$

Even-numbered syndrome pattern that arises by XOR operation of the readout to the newly formed ECC bits

```
0 0 0 0 1 1 0 0
S7   S4 S3   S0
```

This leads to the triggering of a multiple error alarm.
Example 2: Recognition of control errors with the EDC protection Error case: a memory word half remains high-impedance Means for recognition: measure 1
   Allocation of the bit positions:
   X=selected by control 0, Y=selected by control 1
   bold=faulty information part

```
31                    16 15                      00
YYYYYYYYYYYYYYYYXXXXXXXXXXXXXXXX
        C7  C4 C3  C0
        XXXX YYYY
``` consistent memory word under address 1:

```
31                    16 15                      00
1 0 1 0 1 0 1 0 1 0 0 0 1 0 1 0 1 0 1 0 1 0 1 0 1 0 1 0 1 0 1 0
              C7  C4 C3  C0
              0 0 0 0 0 1 1 1
```

When reading under address 1, control 1 incorrectly did not switch the appertaining data and ECC outputs low-impedance. This leads to the following read information:

```
31                    16 15                      00
1 1 1 1 1 1 1 1 1 1 1 1 1 1 1 1 1 0 1 0 1 0 1 0 1 0 1 0 1 0 1 0
              C7  C4 C3  C0
              0 0 0 0 1 1 1 1
```

The ECC bits that were formed over readout data:

```
0 0 1 1 0 0 1 1
C7  C4 C3  C0
```

Even-numbered syndrome pattern that arises by XOR operation of the readout to the newly formed ECC bits

```
0 0 1 1 1 1 0 0
S7  S4 S3  S0
```

Figure 2:
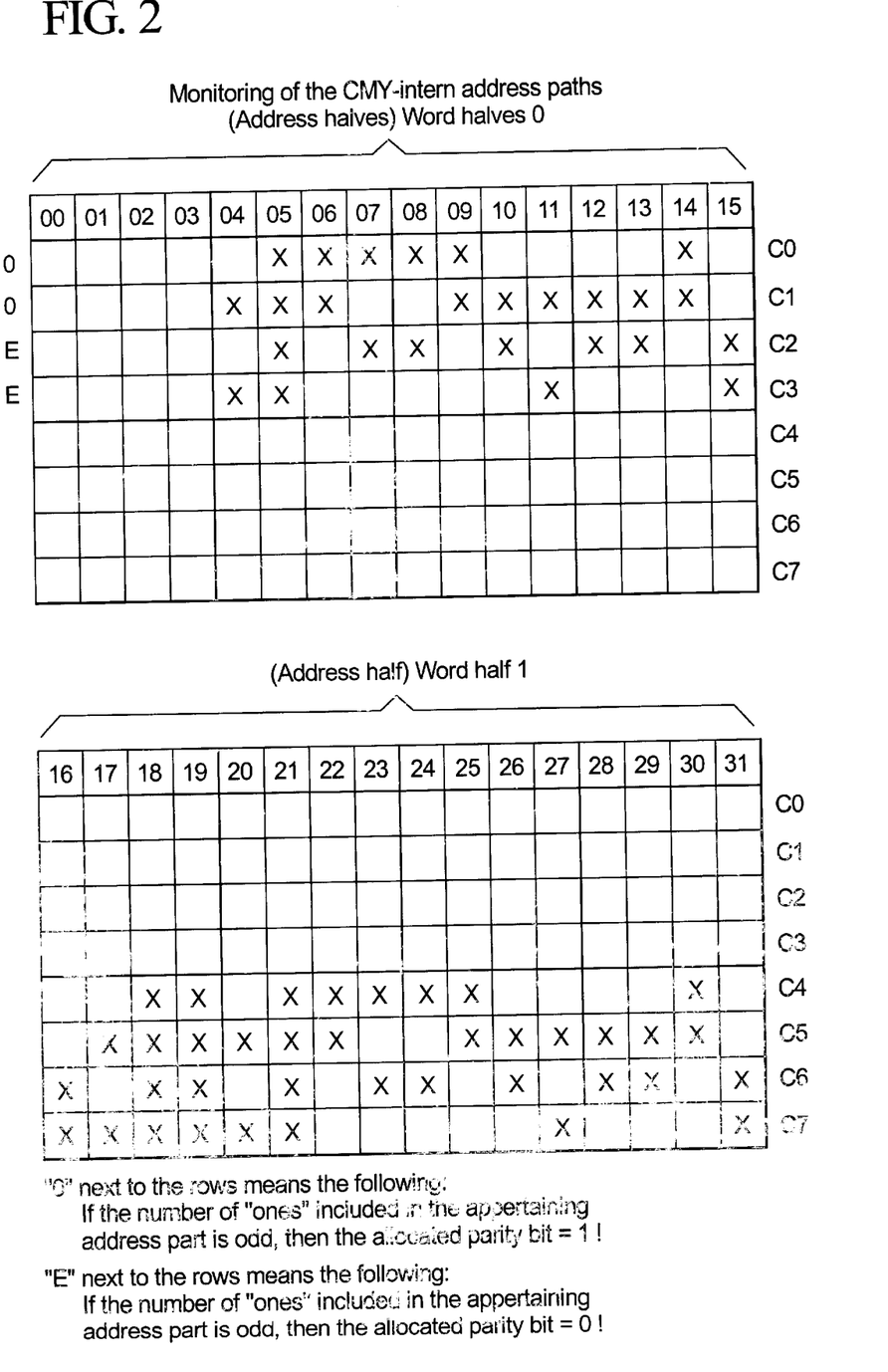
FIG. 2 is an EDC-code table which shows the parity formation of both a data word and the memory address of a data word.

This leads to the triggering of a multiple error alarm.
Example 3: recognition of memory word addressing errors
   Error case: addressing error (simple error) to memory cell with identical data content
   Means for recognition: measure C, i.e. the physical address was co-involved into the formation of the ECC bits (see FIG. 2)
consistent memory word under address
   B'111010101010101000:
      ECC bits gen. only from the data :1111|0011
      par. bits generated from the adr. :0110|0101
      ECC resulting by XOR formation :1001|0110
overall memory word:

```
1 0 1 0 1 0 1 0 1 0 1 0 1 0 1 0 0 1 0 1 0 1 0 1 0 1 0 1 0 1 0 0
31                       16 15                              00
           1 0 0 1 0 1 1 0
           C7   C4 C3   C0
``` consistent memory word under address
   B'101010101010101000:
      ECC bits gen. only from the data :11111|0011
      par. bits generated from the adr. :1010|0101
      ECC resulting by XOR formation :0101|0110 overall memory word:

```
1 0 1 0 1 0 1 0 1 0 1 0 1 0 1 0 0 1 0 1 0 1 0 1 0 1 0 1 0 1 0 0
31                       16 15                              00
           0 1 0 1 0 1 1 0
           C7   C4 C3   C0
```

Given the intended readout under address B'111010101010101000,
readout erroneously occurred under address B'101010101010101000.
This leads to the following read information:

```
31                       16 15                              00
1 0 1 0 1 0 1 0 1 0 1 0 1 0 1 0 1 0 1 0 1 0 1 0 1 0 1 0 1 0 1 0
           C7   C4 C3   C0
           1 1 0 1 1 1 1 1
```

Regenerating the ECC bits:
C7 C4 C3 C0
ECC bits gen. only from the data :1111|0011
par. bits generated from the adr. :0110|0101
ECC resulting by XOR formation :1001|0110
Even-numbered syndrome pattern that arises by XOR operation of the read with the newly formed ECC bits
   :1100|0000
   S7 S4 S3 S0
It leads to the triggering of a multiple error alarm.
Example 4: recognition of memory word addressing errors
   Error case: addressing error (multiple error) to memory cell with different data content
   Means for recognition: measure C, i.e. the physical address was co-involved into the formation of the ECC bits (see FIG. 2)
consistent memory word under address
   B'111010101010101000:
      ECC bits gen. only from the data :1111|0011
      par. bits generated from the adr. :0110|0101
      ECC resulting by XOR formation :1001|10110
      overall memory word:

```
1 0 1 0 1 0 1 0 1 0 1 0 1 0 1 0 0 1 0 1 0 1 0 1 0 1 0 1 0 1 0 0
31                       16 15                              00
           1 0 0 1 0 1 1 0
           C7   C4 C3   C0
``` consistent memory word under address
   B'111011101110001000:
      ECC bits gen. only from the data :0000|0011
      par. bits generated from the adr. :0110|1001
      ECC resulting by XOR formation :0110|1010
      overall memory word:

```
1 1 1 1 1 1 1 1 1 1 1 1 1 1 1 1 0 0 0 0 0 0 0 0 0 0 0 0 0 0 0 0
31                       16 15                              00
           0 1 1 0 1 0 1 1 0
           C7   C4 C3   C0
```

When reading under address
   111010101010101000,
readout erroneously occurred under address
   111011101110001000.

This leads to the following read information:

$$\underset{31}{1}\,1\,1\,1\,1\,1\,1\,1\,1\,1\,1\,1\,1\,1\,1\,\underset{16}{1}\,\underset{15}{0}\,0\,0\,0\,0\,0\,0\,0\,0\,0\,0\,0\,0\,0\,\underset{00}{0}$$

$$\underset{C7}{0\,1\,1\,0}\,\underset{C4'C3}{1\,0\,1\,0}\,\underset{C0}{}$$

Regenerating the ECC bits:
C7 C4 C3 C0
ECC bits gen. only from the data :0000|00110
par. bits generated from the adr. :0110|0101
ECC resulting by XOR formation :0110|0110
C7 C4 C3 C0
Even-numbered syndrome pattern that arises by XOR operation of the read with the newly formed ECC bits :0000|1100
S7 S4 S3 S0
It leads to the triggering of a multiple error alarm.

Although the present invention has been described with reference to specific embodiments, those of skill in the art will recognize that changes may be made thereto without departing from the spirit and scope of the invention as set forth in the hereafter appended claims.

I claim:

1. A memory system wherein a check word is stored together with a respective data word, the memory system comprising:

an error monitoring system, wherein the error monitoring system generates the check word, before the check word is stored, based on a data word to be written and on a write address, according to an EDC code formation rule, and wherein the error monitoring system generates the check word anew based on a data word that has been read out to the monitoring system, and compares bits of the check word generated anew to bits of the check word stored together with the data word and, given inequality, draws conclusions about a type of error from a syndrome pattern; and a shared coding means for generating ECC bits from the data word and parity bits from the write address according to the same coding rules, said check word being generated based on said ECC bits and said parity bits.

* * * * *